Aug. 16, 1932.  C. E. CARTER  1,871,584
SANITARY MILK PAIL
Filed March 12, 1930  2 Sheets-Sheet 1
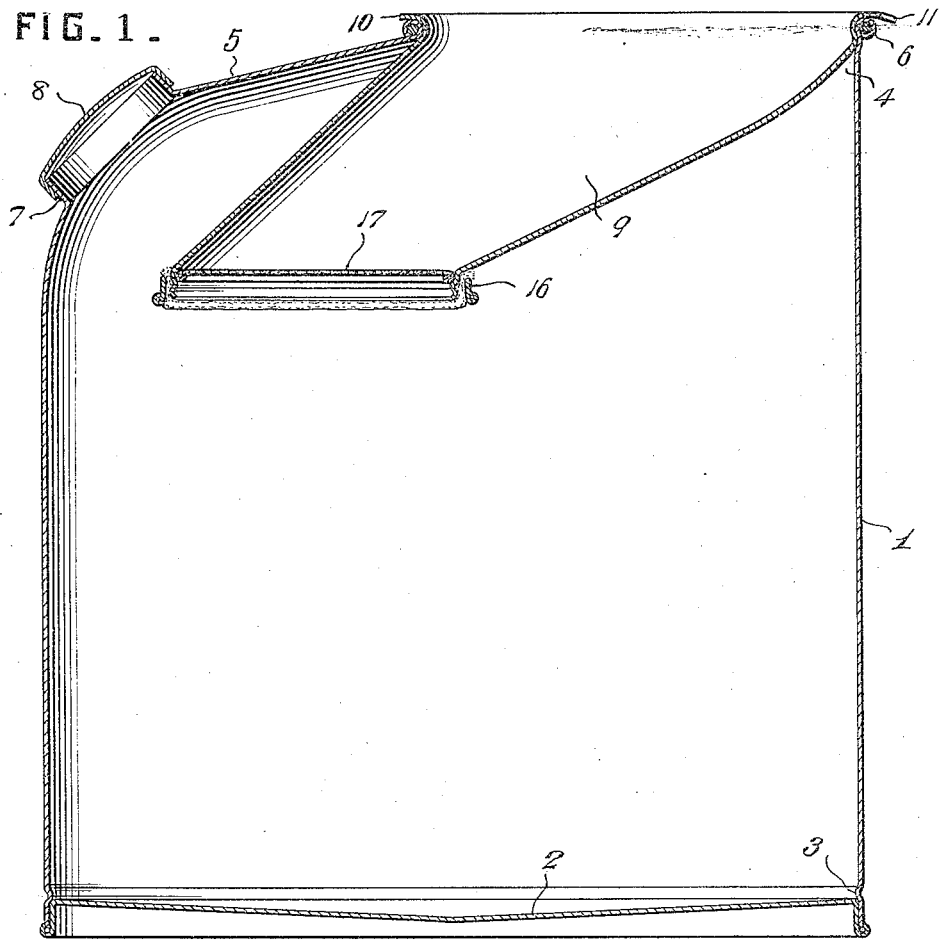
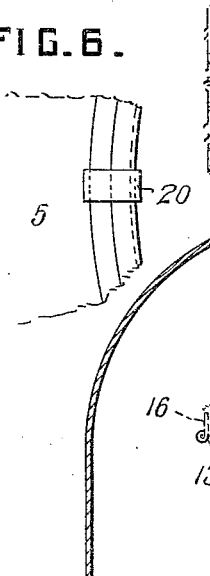
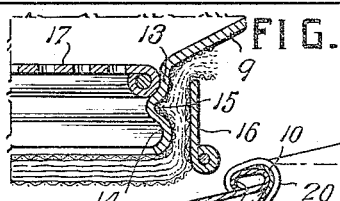
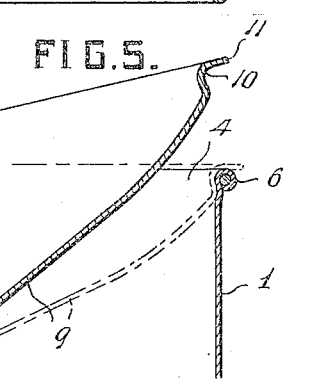
Inventor
CHARLES E. CARTER
By Edgar M. Kitchin
his Attorney Aug. 16, 1932. C. E. CARTER 1,871,584
SANITARY MILK PAIL
Filed March 12, 1930 2 Sheets-Sheet 2
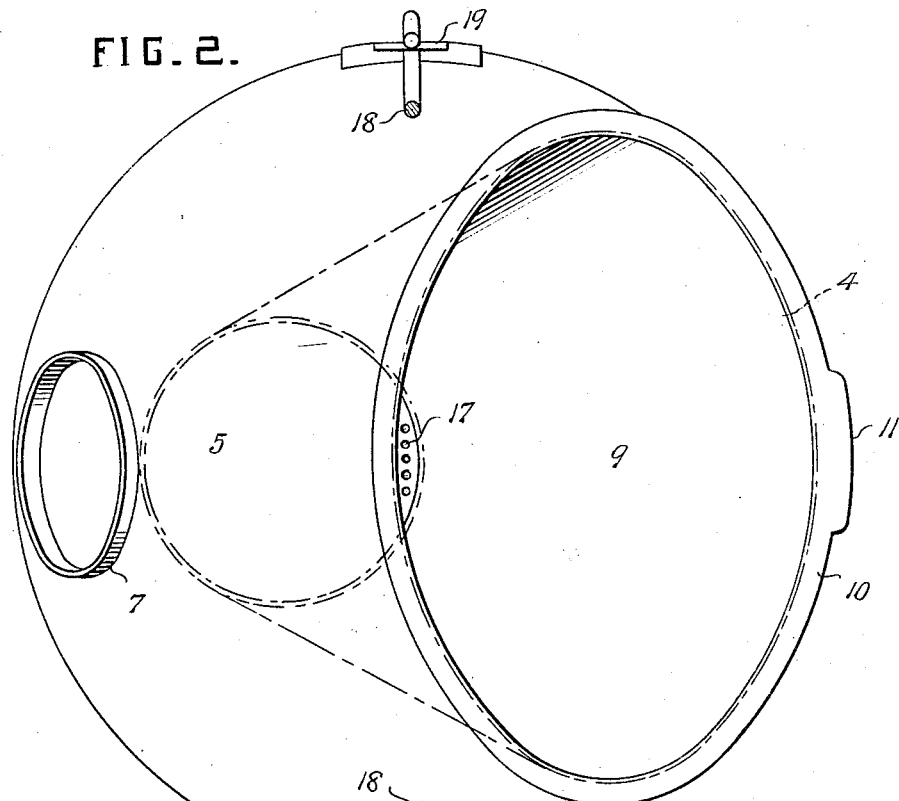
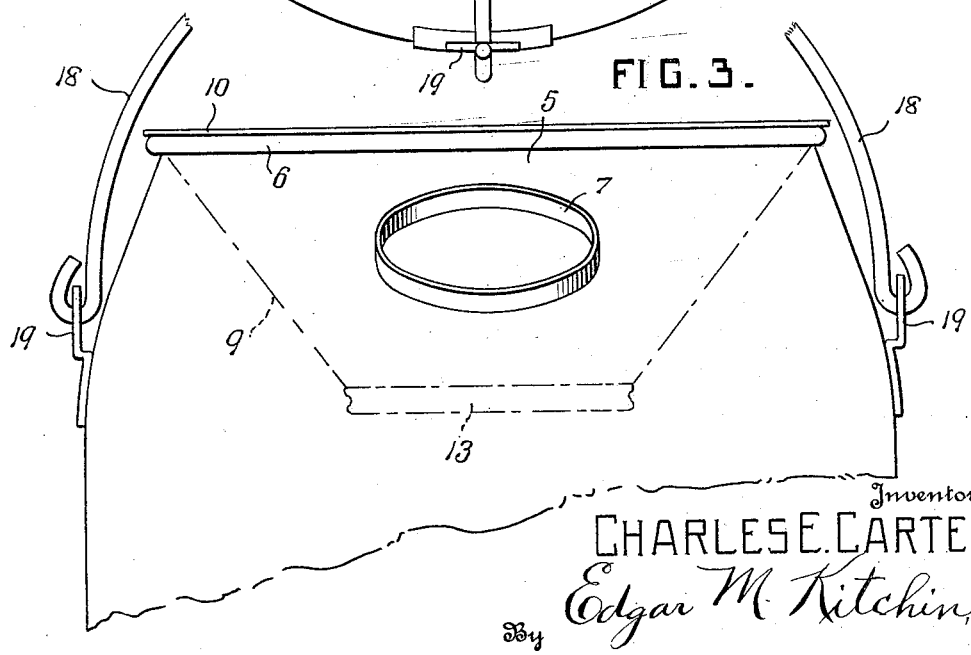
Inventor
CHARLES E. CARTER
By Edgar M. Kitchin,
his Attorney.

Patented Aug. 16, 1932

1,871,584

UNITED STATES PATENT OFFICE

CHARLES E. CARTER, OF FORT WAYNE, INDIANA, ASSIGNOR TO STERLING MANUFACTURING COMPANY, OF FORT WAYNE, INDIANA, A CORPORATION OF DELAWARE

SANITARY MILK PAIL

Application filed March 12, 1930. Serial No. 435,208.

This invention relates to improvements in pails or containers into which milking is done, and the essential objects are maintenance of effective sanitary conditions and preservation against waste.

In greater detail, a further object is the limitation of the receiver portion of a receptacle to such relation to other parts of the receptacle as to limit the use of the receptacle to those conditions assuring freedom from spraying of milk or other loss thereof during the milking operation, and at the same time assuring preservation of maximum cleanliness.

With these and other objects in view as will in part hereinafter become apparent and in part be stated, the invention comprises a container and a receiver therefor located with respect to the container in such relation as to induce proper discharge of the streams of milk to avoid loss and to insure maximum sanitation.

The invention also includes a guide for incoming streams of milk for directing the same without spray or other loss through a bacteria-carrier remover on the way to the interior of the receptacle.

The invention also includes a receptacle shaped and formed to avoid provision of lodgment places for bacteria and bacteria carriers, and in combination therewith means for delivering milk to such container in a high state of sanitation.

The invention also comprises certain other novel constructions, combinations, and arrangements of parts as subsequently specified and claimed.

In the accompanying drawings,—

Figure 1 is a vertical, central section through a milk pail embodying the features of the present invention.

Figure 2 is a top plan view thereof.

Figure 3 is a side elevation of the rear or spout side of the receptacle.

Figure 4 is an enlarged, detailed, fragmentary, vertical section through the strainer parts.

Figure 5 is a fragmentary view similar to Figure 1 of a slightly modified embodiment.

Figure 6 is a fragmentary plan of that part of the structure seen in Figure 5 including the friction spring.

In the art of milk pail construction, many forms have been proposed in an attempt to improve the process of milking both from the standpoint of cleanliness and preservation of the product. A popular form has included a funnel-like opening terminating in a strainer so located that all milk passing into the receptacle must pass through the strainer, but difficulty has been experienced even with such devices, because impact of the streams of milk invariably results in the production of spray and the formation of foam. Loss is occasioned by the spray falling outside of the receptacle intake, and an unsanitary condition is liable to occur when bacterial carriers lodge on or in the foam. Also, difficulty has been experienced in effective cleansing of receptacles after use incident to the presence of seams and other ledges on or in which lodgment is afforded.

The present invention eliminates all opportunity for lodgment and affords incentive to so direct the milk streams as to entirely avoid spraying and largely reduce foam formation.

Referring to the drawings by numerals, 1 indicates the body of a container which is preferably substantially cylindrical and closed at its lower end by a bottom plate 2 welded to the side walls formed by the cylinder 1 in a manner to avoid any cracks, crevices, or ledges on or in which lodgment of bacteria carriers may occur. A constricting bead or shoulder 3 is preferably pressed into the surrounding wall 1 at the place of the upper face of plate 2 to assure complete elimination of any crank or crevice.

The upper end portion of the enclosing wall 1 converges preferably on curved lines to an elliptical opening 4, the said converging walls thus forming a top or cover 5, and the convergence is such that the opening 4 is disposed at or toward one side of the receptacle, which side will be referred to as the front, since it is that portion which is presented toward or beneath the udder. The material of the wall 1 and its integral cover 5 is of sheet material, and preferably of sufficiently highly ductile metal to be drawn from a single integral piece, and the opening 4 is formed by providing a finished margin of said walls bordered by a roll or like stiffening bead 6 formed of the material of the wall. The opening 4 is preferably ovate with its major axis extending across the front portion of the receptacle and its minor axis extending substantially from the extreme foremost portion of the vertical wall 1 rearward to about the middle of the container.

In some forms, as will be hereinafter more specifically pointed out, a spout or pouring orifice will not be required, but in such forms or embodiments as are supplied with such pouring orifice, the same is preferably arranged at the opposite side of the cover or top 5 from the opening 4, the spout 7 being preferably formed integral with the wall 1 and top 5, and being preferably sufficiently short to lie substantially within the extended lines of the side walls 1. An appropriate, removable cap 8 is applied to the spout 7 and retained frictionally in place during all use of the receptacle except when milk is being poured therefrom.

Snugly fitting within and closing the opening 4 is a chute 9, which chute consists of an inwardly and downwardly converging tubular body whose outer end is flared to an oval contour proportioned to snugly and frictionally fit within the bead 6. The chute 9 at its upper or outer end is preferably flanged, at 10, to overhang the bead 6 and provide a positive support as well as the frictional support offered by engagement with the bead. An outstanding lip 11 is preferably provided at one place on flange 10 for facilitating manual removal of the chute 9 from engagement with the bead 6. The chute 9 is inclined rearwardly from the opening 4 and is extended until the lower or inner end of the chute lines almost wholly beneath the cover 5, and may be arranged to completely underlie the cover. The lower end portion of the chute 9 is preferably turned abruptly from the direction of the chute to provide a substantially straight pendent mouth or intake opening bordered by a flange 13. Flange 13 is preferably formed at its lower extremity with an annular recess forming an outstanding bead 14, and immediately above the bead 14 the material is formed into an annular depression 15 providing a second bead constricting the opening. A friction ring or band 16 is adapted to engage the bead 14 with sufficient friction grip to retain the band in place when not in use. When in use, a strainer is provided consisting preferably of fabric and fiber arranged in the form of a sheet and stretched across the intake opening surrounded by flange 13, the said fabric extending across the lower edge of the flange and being clamped into place by the frictional engagement of the band 16 with the marginal portions of the fabric, as seen in Figure 4. Naturally, since the band 16 is proportioned to directly snugly engage bead 14, the interposed fabric produces such a clamping or tight fit as to assure retention of the parts against accidental dislodgment. Also, the groove 15 allows a certain amount of expansion or lateral displacement of the fabric material so that the effective gripping action is substantially along the line corresponding with the crown of the bead 14. The filtering fabric may assume any of various embodiments, but preferably consists of spaced layers of gauze with interposed layers of cotton fiber or like effective filtering material.

A foraminous plate 17 is arranged within the opening surrounded by flange 13 and proportioned to rest on the bead produced by groove 15. The opening surrounded by flange 13 may be of any preferred cross sectional contour, but is preferably circular, and the foraminous plate 17 corresponds in shape. The chute 9 is of such shape and location that ordinarily the plate 17 when removed can be effectively replaced upon its seat by merely being dropped into the chute along which it will slide by gravity until it settles on its seat. The plate 17 while foraminous and, therefore, capable of restricting passage of large objects, is not essentially intended as a screen or filter but serves chiefly to take the impact of the incoming streams of milk, so that their force will not be exerted on the filtering fabric beneath.

To facilitate manual handling, an appropriate bail 18 is provided and engages ears 19, 19, fixed to the sides of the receptacle preferably in position to extend across the receptacle approximately parallel to the major axis of opening 4. Other means of convenient handling of the receptacle may be provided as desired.

In operation, the pail is located with the opening 4 presented toward the udder, and the milker directs the streams of milk into the chute 9. The natural tendency of the operator will be to cause the streams to flow on inclined lines substantially paralleling the walls of the chute, so that the streams strike the plate 17 and are occasioned no opportunity for spraying or other loss. Should any slight spraying occur, the upper wall of the chute 9 is so located as to receive the impact and cause the stray material to collect and be returned by gravity.

When the milking has been completed and the receptacle is to be emptied, the milk may be poured through the spout 7, or, if preferred, the lip 11 may be engaged and the chute 9 lifted sufficiently for allowing the milk to be poured from the receptacle out beneath the chute. When this latter action is to be regularly practiced, the embodiment illustrated in Figures 5 and 6 is preferably employed, as will be hereinafter described.

When the receptacle has been emptied, if not intended for continued use in the completion of a milking operation, it must be cleansed, and, in that event the chute 9 is completely removed by being withdrawn longitudinally through the opening 4, and the operator will find that the unbroken surfaces within the receptacle effectively lend themselves to a cleansing operation. The chute 9 may be easily and effectively cleansed by pulling off the band 16, discarding the fabric, and removing the plate 17. All parts should be thoroughly cleansed before being reassembled. The plate 17 fits in such a manner that it will readily fall from place upon inversion of the chute 9, and the band 16 being only in frictional engagement may be readily forced off. Fresh fabric, of course, will be employed with each new operation of milking.

In Figures 5 and 6, I have illustrated a slightly modified embodiment which so closely simulates that just described as to be identical with it except for the omission of the discharge spout and the provision of friction means for the intake chute. For that reason, the same reference numerals have been applied and the same description will be relied upon except for the slight details modified to provide the desired friction. Said details consist of a spring 20 and an enlargement 21 of bead 6 to afford means of frictional engagement by spring 20. Spring 20 is in the nature of a clip fixed to the upper wall of the chute 9 and bent to enclose and frictionally engage the enlargement 21 under spring pressure. Spring 20 is but a strap spring and may be fixed to chute 9 in any appropriate manner, its free end portion being shaped to cause the spring to frictionally engage and slide upon the enlargement 21 when the chute 9 is elevated to the position seen in full lines in Figure 5, whereat the milk may be poured directly from the receptacle beneath the chute. When the pouring operation has been completed, the chute is pressed back to the dotted line position of Figure 5 where it again closes the opening 4, and the spring 20 exerts a pressure tending to retain the chute in the last-named position. Spring 20 functions to retain the chute in any given position, and is sufficiently elastic to allow the chute to be bodily withdrawn when sufficient pressure is exerted to cause the spring 20 to free itself from the extension 21.

What is claimed is:—

In a milk pail, the combination, with a container having a top partially closed, of an intake chute extending through the top and completing the closure thereof, the said chute being turned at its outer end portion to an angular relation to the main body of the chute and proportioned to snugly fit the opening in the top, and a spring clip engaging the top and said outer end portion and tensioned to maintain frictional engagement between said outer end portion and the top.

In testimony whereof I affix my signature.

CHARLES E. CARTER.